United States Patent
Kanamaru et al.

(10) Patent No.: US 7,763,677 B2
(45) Date of Patent: Jul. 27, 2010

(54) WATER-DISPERSIBLE RESIN COMPOSITION AND WATER-DISPERSIBLE POLYOLEFIN RESIN COMPOSITION

(75) Inventors: Masami Kanamaru, Chiba (JP); Masanori Sera, Chiba (JP); Yutaka Minami, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 32 days.

(21) Appl. No.: 11/913,119

(22) PCT Filed: Jul. 4, 2006

(86) PCT No.: PCT/JP2006/313286

§ 371 (c)(1),
(2), (4) Date: Oct. 30, 2007

(87) PCT Pub. No.: WO2007/004636

PCT Pub. Date: Jan. 11, 2007

(65) Prior Publication Data

US 2009/0023857 A1    Jan. 22, 2009

(30) Foreign Application Priority Data

Jul. 6, 2005    (JP)    ............ 2005-197826

(51) Int. Cl.
*C08L 23/18* (2006.01)
*A61K 9/16* (2006.01)
(52) U.S. Cl. .................. 524/579; 524/543
(58) Field of Classification Search .......... 524/579
See application file for complete search history.

(56) References Cited

U.S. PATENT DOCUMENTS 7,019,091 B2 * 3/2006 Minami et al. ............ 526/160

2005/0124753 A1 * 6/2005 Ashihara et al. ............ 524/543

FOREIGN PATENT DOCUMENTS

| JP | 04 089854 | 3/1992 |
|---|---|---|
| JP | 05 156028 | 6/1993 |
| JP | 9 502216 | 3/1997 |
| JP | 2002 265719 | 9/2002 |
| JP | 2003 026731 | 1/2003 |
| JP | 2004 115712 | 4/2004 |
| JP | 2005 75908 | 3/2005 |
| WO | 2005 035592 | 4/2005 |

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

A water dispersible resin composition capable of forming a flat and smooth coating film with a solidified surface upon application to a base material and excellent in storage stability is provided. It is a water dispersible resin composition comprising 0.01 to 5 parts by mass of a surfactant (C) relative to 100 parts by mass of a combination of 5 to 70% by mass of a side-chain crystalline resin (A) with 95 to 30% by mass of water (B) as well as a water dispersible polyolefin-based resin composition comprising a combination of 5 to 80% by mass of a modified side-chain crystalline polyolefin-based resin with 95 to 20% by mass of water, in which for example, a side-chain crystalline olefin-based polymer (G) obtained by polymerization of one kind or more of higher α-olefins having 10 or more carbon atoms is modified with a radical initiator and an organic acid, organic acid anhydride or organic acid ester.

17 Claims, No Drawings

WATER-DISPERSIBLE RESIN COMPOSITION AND WATER-DISPERSIBLE POLYOLEFIN RESIN COMPOSITION

TECHNICAL FIELD

The present invention relates to water dispersible resin compositions and water dispersible polyolefin-based resin compositions and in more detail, to water dispersible resin compositions and water dispersible polyolefin-based resin compositions capable of forming a flat and smooth coating film with a solidified surface upon application to a base material and excellent in storage stability.

BACKGROUND ART

In the past, polyolefin-based resins are supplied in a form of powder and pellets to the market. A thermal molding machine such as extruders, laminators and the like has to be used to form a film on a base material surface by a method such as coating and others when the polyolefin-based resins are used in this form. There have been such problems that melting and kneading are required when a method to melt and coat the polyolefin-based resins is used, considerable energy is required and the physical properties of the polyolefin-based resins is substantially affected by kneading.

A method for coating has then been proposed, in which the polyolefin-based resins are dissolved in an organic solvent to use as a coating solution. However, in this method, increasing a polyolefin-based resin concentration causes increase of viscosity to deteriorate coatability and is likely to give uneven thickness in the film. On the other hand, lowering the polyolefin-based resin concentration has such problems that repetitive application is required to achieve sufficient thickness.

A method to solve such problems may be considered, in which polyolefin-based resins are dispersed in a form of fine particles in water to give a dispersed solution, which is used for coating. In this case, a surface of plastics, paper, metals and the like is coated by using common coaters, printers, sprayers and the like and dried, to provide water resistivity, chemical resistivity, oil resistivity and the like to the base material. The dispersed solution above can also be used as a heat sealant. In this way, in a state of a dispersed solution above, the formation of polyolefin-based resin film becomes easier on a base material surface.

However, fine particles of polyolefin-based resins are not easy to disperse in water. For example, a dispersed solution of a water-based polyolefin wax consisting of a polypropylene wax, water and a surfactant has been disclosed (for example, see Patent Document 1). Specifically, a dispersed solution of a water-based polyolefin wax has been disclosed, which comprises a polypropylene wax with a specific average particle diameter and a specific acid value and a specific glyceride of unsaturated monocarboxylic acid. In this technique, there is a problem with flatness and smoothness of a coating film since the polypropylene wax is dispersed as a solid.

A manufacturing method of a water dispersible solution to disperse an acid-modified polyolefin in an alkaline aqueous solution is also disclosed (for example, see Patent Document 2), in which an acid-modified product of a polyethylene wax or propylene wax is used in the Example. However, in this technique, there is also a problem with flatness and smoothness of the coated film since the polyethylene wax and polypropylene wax are dispersed as a solid.

Patent Document 1: Japanese Publication of Translation of PCT No. H09-502216

Patent Document 2: Japanese Patent Application Laid-Open (kokai) No. H05-156028

DISCLOSURE OF THE INVENTION

Problems to be Solved by the Invention

The present invention has been carried out in view of the above circumstances and is aimed at providing a water dispersible resin composition capable of forming a flat and smooth coating film with a solidified surface upon application to a base material and excellent in storage stability.

Means for Solving the Problems

The present inventors have earnestly studied and found a resin composition comprising a side-chain crystalline resin with a low melting point or modified side-chain crystalline polyolefin-based resin, that is, the resin composition comprising a specific amount of the side-chain crystalline resin, water and a surfactant or the resin composition comprising a specific amount of the modified side-chain crystalline polyolefin-based resin and water can achieve the above object. The present invention is completed based on such findings.

That is, the present invention provides a water dispersible resin composition and a water dispersible polyolefin-based resin composition as follows.

1. A water dispersible resin compositions characterized by comprising 0.01 to 5 parts by mass of a surfactant (C) relative to 100 parts by mass of a combination of 5 to 70% by mass of a side-chain crystalline resin (A) with 95 to 30% by mass of water (B).

2. The water dispersible resin composition according to 1 above, wherein a content of the surfactant of component (C) is 0.01 to 1 part by mass.

3. The water dispersible resin composition according to 1 or 2 above, wherein the side-chain crystalline resin of component (A) is (i) a side-chain crystalline olefin-based polymer obtained by polymerization of one kind or more of higher α-olefins having 10 or more carbon atoms or (ii) a side-chain crystalline olefin-based polymer obtained by polymerization of one kind or more of higher α-olefins having 10 or more carbon atoms and one kind or more of α-olefins having 9 or less carbon atoms and the content of said higher α-olefin unit content is 50 mol % or more.

4. The water dispersible resin composition according to any of 1 to 3 above, wherein 0.01 to 1 part by mass of a water soluble polymer compound (D) is further comprised relative to 100 parts by mass of a sum of component (A) and component (B).

5. The water dispersible resin composition according to any of 1 to 4 above, wherein 2 to 200 parts by mass of a water insoluble organic solvent (E) is further comprised relative to 100 parts by mass of a sum of component (A) and component (B).

6. The water dispersible resin composition according to any of 1 to 3 above, wherein a mixed solution of component (A), component (B) and component (C) is mixed at a temperature range of 50 to 90° C.

7. The water dispersible resin composition according to 4 above, wherein a mixed solution of component (A), component (B), component (C) and component (D) is mixed at a temperature range of 50 to 90° C.

8. The water dispersible resin composition according to 5 above, wherein a mixed solution I of component (A) and component (E) with a mixed solution of component (B) and component (C) or a mixed solution of said mixed solution I with a mixed solution of component (B), component (C) and component (D) is mixed at a temperature range of 50 to 90° C.

9. A water dispersible polyolefin-based resin composition characterized by comprising a combination of 5 to 80% by mass of a modified side-chain crystalline polyolefin-based resin (G) and 95 to 20% by mass of water (B), wherein (i) a side-chain crystalline olefin-based polymer obtained by polymerization of one kind or more of higher α-olefins having 10 or more carbon atoms or (ii) a side-chain crystalline olefin-based polymer obtained by polymerization of one kind or more of higher α-olefins having 10 or more carbon atoms and one kind or more of α-olefins having 9 or less carbon atoms with a content of said higher α-olefin unit being 50 mol % or more is modified with a radical initiator and an organic acid, organic acid anhydride or organic acid ester.

10. The water dispersible polyolefin-based resin composition according to 9 above, wherein one kind or more selected from 0.01 to 1 part by mass of a water soluble basic substance (F), 0.01 to 1 part by mass of a surfactant (C) and 0.01 to 1 part by mass of a water soluble polymer compound (D) is comprised relative to 100 parts by mass of a sum of component (G) and component (B).

11. The water dispersible polyolefin-based resin composition according to 9 or 10 above, wherein 2 to 200 parts by mass of a water insoluble organic solvent (E) is comprised relative to 100 parts by mass of a sum of component (G) and component (B).

12. The water dispersible polyolefin-based resin composition according to 9 above, wherein component (G) and component (B) are mixed at a temperature range of 50 to 90° C.

13. The water dispersible polyolefin-based resin composition according to 10 above, wherein a mixed solution of component (B) with one kind or more selected from component (G), and component (F), component (C) and component (D) is mixed at a temperature range of 50 to 90° C.

14. The water dispersible polyolefin-based resin composition according to 11 above, wherein a mixed solution of component (B) with a mixed solution II of component (G) and component (E) or a mixed solution of said mixed solution II with component (B) and one kind or more selected from component (F), component (C) and component (D) is mixed at a temperature range of 50 to 90° C.

EFFECT OF THE INVENTION

According to the present invention, a water dispersible resin composition and a water dispersible polyolefin-based resin composition capable of forming a flat and smooth coating film with a solidified surface upon application to a base material and excellent in storage stability can be provided.

BEST MODES FOR CARRYING OUT THE INVENTION

The water dispersible resin composition of the present invention (hereinafter optionally referred to simply as "water dispersible composition I") comprises 0.01 to 5 parts by mass of a surfactant (C) relative to 100 parts by mass of a combination of 5 to 70% by mass of a side-chain crystalline resin (A) with 95 to 30% by mass of water (B).

The side-chain crystalline resin of component (A) used in the present invention is a polymer also called a comb polymer, which has side chains consisting of an aliphatic and/or aromatic group on a skeleton consisting of an organic structure (main chain), and characterized in that the side chain has a structure capable of being incorporated into a crystalline structure. A length of its side chain section is five times or more a distance between side chains.

The side-chain crystalline resin of component (A) includes the side-chain crystalline polymer such as olefin-based polymers, alkyl acrylate-based polymers, alkyl methacrylate-based polymers, alkylethylene oxide-based polymers, polysiloxane-based polymers, acrylamide-based polymers and the like. The alkyl acrylate-based polymers include poly(stearyl acrylate) and the like. The alkyl methacrylate-based polymers include poly(stearyl methacrylate) and the like. Among them, side-chain crystalline olefin polymers excellent in chemical resistivity are preferred.

The side-chain crystalline olefin-based polymer used in the present invention is (i) the side-chain crystalline olefin polymer obtained by polymerization of one kind or more of higher α-olefins having 10 or more carbon atoms or (ii) the side-chain crystalline olefin polymer obtained by polymerization of one kind or more of higher α-olefins having 10 or more carbon atoms and one kind or more of α-olefins having 9 or less carbon atoms and comprising 50 mol % or more of the higher α-olefin unit. That is, they are the polymer comprising as a main component a higher α-olefin having 10 or more carbon atoms (hereinafter optionally abbreviated as "higher α-olefin polymer". Higher α-olefins are preferably $C_{10}$-$C_{40}$ olefins, more preferably $C_{14}$-$C_{24}$ olefins. The side chain of the polymer can be crystallized when the number of carbon atoms is 10 or more.

α-Olefins having 10 or more carbon atoms include decene-1, dodecene-1, tetradecene-1, hexadecene-1, octacecene-1 and the like. α-Olefins having 9 or less carbon atoms also include propylene, butene-1, pentene-1, 4-methylpentene-1, hexene-1, octene-1, nonene-1 and the like.

A content of a higher α-olefin having 10 or more carbon atoms in higher α-olefin polymers is preferably 50 to 100 mol %, more preferably 65 to 100 mol %, further more preferably 80 to 100 mol %, yet further more preferably 90 to 100 mol %, and particularly preferably 100 mol %. Crystallinity of the side chain becomes higher, when a content of a higher α-olefin having 10 or more carbon atoms is 50 mol % or more.

The higher α-olefin polymers used in the present invention preferably have an isotactic structure, in which a value of stereoregularity index M2 is 50 to 90 mol %, preferably 55 to 85 mol %, more preferably 55 to 75 mol %. Stereoregularity is preferably controlled in a middle range, more preferably in a middle range or higher.

Storage stability is improved, when M2 is 90 mol % or less. Storage stability is also improved, when M2 is 50 mol % or more because its crystallinity is not lowered. A value of stereoregurality index M4, which is a similar index to pentad isotacticity is preferably 25 to 60 mol %, more preferably 25 to 45 mol %. A value of stereoregurality index MR, which is an index of disorder in stereoregularity is preferably 2.5 mol % or more, more preferably 5 mol % or more, further more preferably 10 mol % or more. Storage stability is improved when MR is 2.5 mol % or more.

The values of these stereoregularity indices M2, M4 and MR are evaluated according to a method proposed in Macromolecules, 24, 2334 (1991) reported by T. Asakura, M. Demura and Y. Nishiyama. That is, these can be determined by using observation in $^{13}C$ nuclear magnetic resonance spectra of splitting the methylene carbon in the α-position of the side chain reflecting the difference of its stereoregularity. The smaller the values of M2 and M4 are, the smaller isotacticity is indicated, whereas the larger the value of MR is, the more disordered the stereoregularity is.

Measurement of $^{13}C$ nuclear magnetic resonance spectra is carried out with the apparatus and conditions below.

Instrument: Model JNM-EX 400 $^{13}C$-NMR instrument manufactured by JEOL., Ltd.
Method: Complete proton decoupling
Concentration: 230 mg/mL
Solvent: Mixed solvent of 1,2,4-trichlorobenzene and deuterobenzene in a 90:10 ratio (by volume)
Temperature: 130° C.
Pulse width: 45°
Pulse recurrence time: 4 seconds
Integration: 10000 times Values of stereoregularity indices M2, M4 and MR were also calculated as follows. That is, six peaks of strong absorption due to the mixed solvent are observed at 127 to 135 ppm, of which a value of the fourth peak from a lower magnetic field is assigned as 131.1 ppm to use as a basis of the chemical shift. In this case, absorption peaks due to the methylene carbon atom in the α-position of the side chain are observed around 34 to 37 ppm. In this case, M2, M4 and MR (mol %) are evaluated using the following formula.

$M2$=[(integrated intensity at 36.2 to 35.3 ppm)/(integrated intensity at 36.2 to 34.5 ppm)]×100

$M4$=[(integrated intensity at 36.2 to 35.6 ppm)/(integrated intensity at 36.2 to 34.5 ppm)]×100

$MR$=[(integrated intensity at 35.3 to 35.0 ppm)/(integrated intensity at 36.2 to 34.5 ppm)]×100

Higher α-olefin polymers used in the present invention preferably have properties as follows. That is, they are crystalline resins having a melting point (TmD) defined as a temperature of a top of the maximum peak in a melting endothermic curve, which is obtained using a differential scanning calorimeter (DSC) by elevating a temperature at a rate of 10° C./min to 190° C. after holding a sample at −10° C. for 5 minutes under a nitrogen atmosphere as well as demonstrating one or two peaks observed in the melting endothermic curve, which is obtained by lowering a temperature at a rate of 5° C./min to −10° C. after holding it at a temperature of 190° C. for 5 minutes, and then elevating a temperature at a rate of 10° C./min to 190° C. and having a melting point (Tm) defined as its peak top temperature of 10 to 100° C., preferably 10 to 70° C.

When this melting point is 100° C. or less, water dispersible composition I excellent in storage stability can be obtained without intensifying agitation in manufacture of water dispersible composition I. On the other hand, when this melting point is 10° C. or above, stickiness to the surface after solidification can be prevented upon application of water dispersible composition I to a base material.

Presence of only one peak herein means no absorption due to other peaks or shoulders. A half width of melting peak Wm (° C.) defined as a peak width at a midpoint of a height between a baseline in a whole melting curve and a top of the peak on Tm measurement is preferably 12° C. or less. Storage stability is improved, when Wm is 12° C. or less.

Higher α-olefin polymers used in the present invention have a weight average molecular weight (Mw) calculated in terms of polystyrene determined by a gel permeation chromatography (GPC) method of 1,000 to 10,000,000, preferably 5,000 to 5,000,000, more preferably 5,000 to 1,000,000, further more preferably 5,000 to 500,000, particularly preferably 5,000 to 300,000. Strength of a coating film is not lowered when molecular weight (Mw) is 1,000 or above and viscosity is not high but appropriate when it is 10,000,000 or less, resulting in easier production of water dispersible composition I.

A molecular weight distribution (Mw/Mn) is also 5.0 or less, preferably 4.5 or less. When Mw/Mn is 5.0 or less, a composition distribution becomes not too broad but appropriate so that deterioration of the surface characteristics of a coating film, particularly stickiness can be prevented. This value also contributes to improvement of storage stability.

Higher α-olefin polymers used in the present invention preferably have a single spin-lattice relaxation time (T1) above the melting point observed in measurement of T1 by the solid state nuclear magnetic resonance spectroscopy.

The spin-lattice relaxation time (T1 (ms)) at each temperature was measured and confirmed by a solid state NMR measurement with an inversion recovery method (a pulse method, 180°–τ–90°) using a solid state NMR measurement instrument below.

Instrument: Model JNM-M25 (Pulse NMR) spectrometer manufactured from JEOL, Ltd.
Measured nucleus: Hydrogen nucleus ($^{1}H$)
Measured frequency: 25 MHz
90° pulse width: 2.0 microseconds When spin diffusion between phases is fast, the relaxation is averaged out to observe single T1 at a melting point or lower even in the system of a crystalline polymer, in which a crystalline layer and an amorphous layer coexist. However, when a spin diffusion rate between phases is slowed due to melting or others, a plurality of T1 could be observed. This could be observed when the system is inhomogeneous and a size of crystals is large or its size is distributed.

That is, observation of single T1 at melting point or above means the system is homogenous and a size of crystals is small and size distribution is narrow. In the present invention, it is preferred that the system is homogeneous and a size of crystals is small.

Higher α-olefin polymers used in the present invention preferably have single peak X1 due to crystallization of a side chain observed in 15 degrees<2θ<30 degrees in measurement of a wide angle x-ray scattering intensity distribution.

In measurement of such x-ray intensity distribution, there could be such cases that a peak derived from crystals of a side chain is not observed, a peak derived from crystals of a side chain is not single and the peak of the crystalline component is wide to cause lowering strength of a coating film. The wide angle x-ray scattering intensity distribution can be measured as follows.

That is, monochromatic light of a CuKα line (wavelength=1.54 Å) with a power of 30 kV and 100 mA is collimated through a pinhole with diameter φ=2 mm using an anode type Rotaflex RU-200 x-ray generator manufactured by Rigaku Corporation to measure a wide angle x-ray scattering (WAXS) intensity distribution for an exposure time of 1 minute using a position sensitive proportional counter.

Higher α-olefin polymers used in the present invention can be manufactured using metallocene-based catalysts illustrated below and among them, catalysts comprising transition metal compounds with $C_2$ symmetry and $C_1$ symmetry capable of synthesizing isotactic polymers are particularly preferably used.

Specific examples include a method to homopolymerize a higher α-olefin having 10 or more carbon atoms, a method to polymerize two or more kinds of higher α-olefins having 10 or more carbon atoms or a method to polymerize an α-olefin having 10 or more carbon atoms and an α-olefin having 9 or less carbon atoms in the presence of a polymerization catalyst comprising (a) a transition metal compound represented by the general formula (I) and (b) at least one kind of components selected from a compound (b-1) capable of reacting with said transition metal compound of component (a) or its derivatives to form an ionic complex and aluminoxanes (b-2).

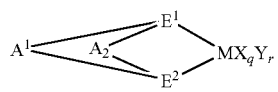
(I)

(Wherein M represents metal elements in groups 3 to 10 in a periodic table or lanthanoid series, $E^1$ and $E^2$ each are ligands selected from substituted cyclopentadienyl, indenyl, substituted indenyl, heterocyclopentadienyl, substituted heterocyclopentadienyl, amide, phosphine, hydrocarbon and silicon-containing groups to form a bridged structure via $A^1$ and $A^2$ and may be the same or different one another and X indicates a σ-bonding ligand, and when plural Xs are present, they may be the same or different and X may be bridged with other X, $E^1$, $E^2$ or Y.

Y indicates a Lewis base, and when plural Ys are present, they may be the same or different and Y may be bridged with other Y, $E^1$, $E^2$ or X, $A^1$ and $A^2$ are two bridging groups to link two ligands and indicate $C_1$-$C_{20}$ hydrocarbons, $C_1$-$C_{20}$ halogen-containing hydrocarbons, silicon-containing groups, germanium-containing groups, tin-containing groups, —O—, —CO—, —S—, —$SO_2$—, —Se—, —$NR^1$—, —$PR^1$—, —$P(O)R^1$, —$BR^1$— or —$AlR^1$ and $R^1$ indicates a hydrogen atom, halogen atoms, $C_1$-$C_{20}$ hydrocarbons or $C_1$-$C_{20}$ halogen-containing hydrocarbons and may be the same or different one another. q is an integer of 1 to 5 to indicate [(valency of M)–2] and r indicates an integer of 0 to 3.)

M in the general formula (I) above indicates metal elements in groups 3 to 10 in periodic table or lanthanoid series and includes as a specific example, titanium, zirconium, hafnium, yttrium, vanadium, chromium, manganese, nickel, cobalt, palladium and lanthanoid series metals, but among them, titanium, zirconium and hafnium are preferred in terms of olefin polymerization activity.

$E^1$ and $E^2$ each indicates a ligand selected from substituted cyclopentadienyl, indenyl, substituted indenyl, heterocyclopentadienyl, substituted heterocyclopentadienyl, amide (—N<), phosphine (—P<), hydrocarbon (>CR— and >C<) groups and silicon-containing groups (>SiR—, and >Si<) (however, R is a hydrogen atom, $C_1$-$C_{20}$ hydrocarbon or heteroatom-containing groups) forming a bridged structure via $A^1$ and $A^2$. $E^1$ and $E^2$ may also be the same or different one another. Substituted cyclopentadienyl, indenyl and substituted indenyl groups are preferred as these $E^1$ and $E^2$ in terms of higher polymerization activity.

X indicates a σ-bonding ligand, and when plural Xs are present, they may be the same or different one another and X may be bridged with other X, $E^1$, $E^2$ or Y. Specific examples of said X include halogen atoms, $C_1$-$C_{20}$ hydrocarbons, $C_1$-$C_{20}$ alkoxys, $C_6$-$C_{20}$ aryloxys, $C_1$-$C_{20}$ amides, $C_1$-$C_{20}$ silicon-containing groups, $C_1$-$C_{20}$ phosphides, $C_1$-$C_{20}$ sulfides, $C_1$-$C_{20}$ acyl groups and the like.

On the other hand, Y indicates a Lewis base, and when plural Ys are present, they may be the same or different and Y may be bridged with other Y, $E^1$, $E^2$ or X. Specific examples of a Lewis base of said Y include amines, ethers, phosphines, thioethers and the like.

Next, $A^1$ and $A^2$ are a divalent bridging group linking two ligands and indicate $C_1$-$C_{20}$ hydrocarbons, $C_1$-$C_{20}$ halogen-containing hydrocarbons, silicon-containing groups, germanium-containing groups, tin-containing groups, —O—, —CO—, —S—, —$SO_2$—, —Se—, —$NR^1$—, —$PR^1$—, —$P(O)R^1$—, —$BR^1$— or —$AlR^1$— and $R^1$ indicates a hydrogen atom, halogen atom, $C_1$-$C_{20}$ hydrocarbon or $C_1$-$C_{20}$ halogen-containing hydrocarbon and may be the same or different one another. Such bridging groups include, for example, those represented by the general formula,

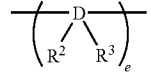

(Wherein D is a carbon, silicon, germanium or tin, $R^2$ and $R^3$ each is a hydrogen atom or $C_1$-$C_{20}$ hydrocarbon and may be the same or different one another or linked each other to form a ring structure. e indicates an integer of 1 to 4.)

and their specific examples include methylene, ethylene, ethylidene, propylidene, isopropylidene, cyclohexylidene, 1,2-cyclohexylene, vinylidene ($CH_2$=C=), dimethylsilylene, diphenylsilylene, methylphenylsilylene, dimethylgermylene, dimethylstannylene, tetramethyldisilylene, diphenyldisilylene and the like. Among them, ethylene, isopropylidene and dimethylsilylene groups are preferred in terms of higher polymerization activity. q is an integer of 1 to 5 to indicate [(valency of M)–2] and r indicates an integer of 0 to 3.

Among such transition metal compounds represented by the general formula (I), the transition metal compounds with a double-crosslinked biscyclopentadienyl derivative represented by the general formula (II) as a ligand are preferred.

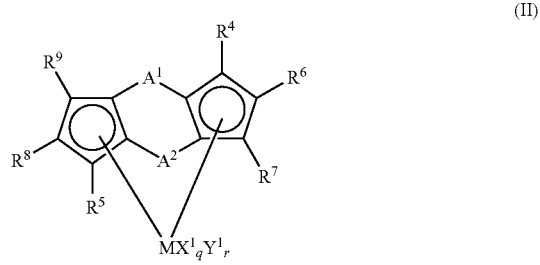
(II)

M, $A^1$, $A^2$, q or r in the general formula (II) above are the same as those in the general formula (I). $X^1$ indicates a σ-bonding ligand, and when plural $X^1$ are present, they may be the same or different and $X^1$ may be bridged with other $X^1$ or $Y^2$. Specific examples of this $X^1$ can include those illustrated in description of X in the general formula (I). $Y^1$ indicates a Lewis base, and when plural $Y^1$ are present, they may be the same or different and $Y^1$ may be bridged with other $Y^1$ or $X^1$. Specific examples of $Y^1$ include those illustrated in description of Y in the general formula (I).

$R^4$ to $R^9$ each indicate a hydrogen atom, halogen atom, $C_1$-$C_{20}$ hydrocarbon, $C_1$-$C_{20}$ halogen-containing hydrocarbon, silicon-containing group or heteroatom-containing group, but at least one of them must not be a hydrogen atom. $R^4$ to $R^9$ may be also the same or different one another and adjacent groups may be linked each other to form a ring. Among them, $R^6$ and $R^7$ and $R^8$ and $R^9$ are preferably linked to form a ring, respectively. A group containing a heteroatom such as an oxygen, halogen, silicon atom or other is preferred as $R^4$ and $R^5$ because of higher polymerization activity.

The transition metal compounds with such double-crosslinked biscyclopentadienyl derivatives as a ligand preferably contain a silicon atom as a crosslinking group between ligands.

Specific examples of the transition metal compounds represented by the general formula (I) include (1,2'-ethylene)(2,1'-ethylene)bis(indenyl)zirconium dichloride, (1,2'-methylene)(2,1'-methylene)bis(indenyl)zirconium dichloride, (1,2'-isopropylidene)(2,1'-isopropylidene)bis(indenyl)zirconium dichloride, (1,2'-ethylene)(2,1'-ethylene)bis(3-methylindenyl)zirconium dichloride, (1,2'-ethylene)(2,1'-ethylene)bis(4,5-benzoindenyl)zirconium dichloride, (1,2'-ethylene)(2,1'-ethylene)bis(4-isopropylindenyl)zirconium dichloride, (1,2'-ethylene)(2,1'-ethylene)bis(5,6-dimethylindenyl)zirconium dichloride, (1,2'-ethylene)(2,1'-ethylene)bis(4,7-diisopropylindenyl)zirconium dichloride, (1,2'-ethylene)(2,1'-ethylene)bis(4-phenylindenyl)zirconium dichloride, (1,2'-ethylene)(2,1'-ethylene)bis(3-methyl-4-isopropylindenyl)zirconium dichloride, (1,2'-ethylene)(2,1'-ethylene)bis(5,6-benzoindenyl)zirconium dichloride, (1,2'-ethylene)(2,1'-isopropylidene)bis(indenyl)zirconium dichloride, (1,2'-methylene)(2,1'-ethylene)bis(indenyl)zirconium dichloride, (1,2'-methylene)(2,1'-isopropylidene)bis(indenyl)zirconium dichloride, (1,2'-dimethylsilylene)(2,1'-dimethylsilylene)bis(indenyl)zirconium dichloride, (1,2'-dimethylsilylene)(2,1'-dimethylsilylene)bis(3-methylindenyl)zirconium dichloride, (1,2'-dimethylsilylene)(2,1'-dimethylsilylene)bis(3-n-butylindenyl)zirconium dichloride, (1,2'-dimethylsilylene)(2,1'-dimethylsilylene)bis(3-isopropylindenyl)zirconium dichloride, (1,2'-dimethylsilylene)(2,1'-dimethylsilylene)bis(3-trimethylsilylmethylindenyl)zirconium dichloride, (1,2'-dimethylsilylene)(2,1'-dimethylsilylene)bis(3-phenylindenyl)zirconium dichloride, (1,2'-dimethylsilylene)(2,1'-dimethylsilylene)bis(4,5-benzoindenyl)zirconium dichloride, (1,2'-dimethylsilylene)(2,1'-dimethylsilylene)bis(4-isopropylindenyl)zirconium dichloride, (1,2'-dimethylsilylene)(2,1'-dimethylsilylene)bis(5,6-dimethylindenyl)zirconium dichloride, (1,2'-dimethylsilylene)(2,1'-dimethylsilylene)bis(4,7-di-isopropylindenyl)zirconium dichloride, (1,2'-dimethylsilylene)(2,1'-dimethylsilylene)bis(4-phenylindenyl)zirconium dichloride, (1,2'-dimethylsilylene)(2,1'-dimethylsilylene)bis(3-methyl-4-isopropylindenyl)zirconium dichloride, (1,2'-dimethylsilylene)(2,1'-dimethylsilylene)bis(5,6-benzoindenyl)zirconium dichloride, (1,2'-dimethylsilylene)(2,1'-isopropylidene)bis(indenyl)zirconium dichloride, (1,2'-dimethylsilylene)(2,1'-isopropylidene)bis(3-methylindenyl)zirconium dichloride, (1,2'-dimethylsilylene)(2,1'-isopropylidene)bis(3-isopropylindenyl)zirconium dichloride, (1,2'-dimethylsilylene)(2,1'-isopropylidene)bis(3-n-butylindenyl)zirconium dichloride, (1,2'-dimethylsilylene)(2,1'-isopropylidene)bis(3-trimethylsilylmethylindenyl)zirconium dichloride, (1,2'-dimethylsilylene)(2,1'-isopropylidene)bis(3-trimethylsilylindenyl)zirconium dichloride, (1,2'-dimethylsilylene)(2,1'-isopropylidene)bis(3-phenylindenyl)zirconium dichloride, (1,2'-dimethylsilylene)(2,1'-methylene)bis(indenyl)zirconium dichloride, (1,2'-dimethylsilylene)(2,1'-methylene)bis(3-methylindenyl)zirconium dichloride, (1,2'-dimethylsilylene)(2,1'-methylene)bis(3-isopropylindenyl)zirconium dichloride, (1,2'-dimethylsilylene)(2,1'-methylene)bis(3-n-butylindenyl)zirconium dichloride, (1,2'-dimethylsilylene)(2,1'-methylene)bis(3-trimethylsilylmethylindenyl)zirconium dichloride, (1,2'-dimethylsilylene)(2,1'-methylene)bis(3-trimethylsilylindenyl)zirconium dichloride, (1,2'-diphenylsilylene)(2,1'-methylene)bis(indenyl)zirconium dichloride, (1,2'-diphenylsilylene)(2,1'-methylene)bis(3-methylindenyl)zirconium dichloride, (1,2'-diphenylsilylene)(2,1'-methylene)bis(3-isopropylindenyl)zirconium dichloride, (1,2'-diphenylsilylene)(2,1'-methylene)bis(3-n-butylindenyl)zirconium dichloride, (1,2'-diphenylsilylene)(2,1'-methylene)bis(3-trimethylsilylmethylindenyl)zirconium dichloride, (1,2'-diphenylsilylene)(2,1'-methylene)bis(3-trimethylsilylindenyl)zirconium dichloride, (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-isopropylcyclopentadienyl)(3'-methyl-5'-isopropylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyll)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropylidene)(3-methyl-5-isopropylcyclopentadienyl)(3'-methyl-5'-isopropylcyclopentadienyl)zirconium dichloride, (1,2'-methylene)(2,1'-methylene)(3-methyl-5-isopropylcyclopentadienyl)(3'-methyl-5'-isopropylcyclopentadienyl)zirconium dichloride, (1,2'-methylene)(2,1'-isopropylidene)(3-methyl-5-isopropylcyclopentadienyl)(3'-methyl-5'-isopropylcyclopentadienyll)zirconium dichloride, (1,1'-dimethylsilylene)(2,2'-dimethylsilylene)bis(indenyl)zirconium dichloride, (1,1'-diphenylsilylene)(2,2'-dimethylsilylene)bis(indenyl)zirconium dichloride, (1,1'-dimethylsilylene)(2,2'-dimethylsilylene)bis(indenyl)zirconium dichloride, (1,1'-diisopropylsilylene)(2,2'-dimethylsilylene)bis(indenyl)zirconium dichloride, (1,1'-dimethylsilylene)(2,2'-diisopropylsilylene)bis(indenyl)zirconium dichloride, (1,'-dimethylsilyleneindenyl)(2,2'-dimethylsilylene-3-trimethylsilylindenyl)zirconium dichloride, (1,1'-diphenylsilyleneindenyl)(2,2'-diphenylsilylene-3-trimethylsilylindenyl)zirconium dichloride, (1,1'-diphenylsilyleneindenyl)(2,2'-dimethylsilylene-3-trimethylsilylindenyl)zirconium dichloride, (1,1'-dimethylsilyleneindenyl)(2,2'-diphenylsilylene-3-trimethylsilylindenyl)zirconium dichloride, (1,1'-diisopropylsilyleneindenyl)(2,2'-dimethylsilylene-3-trimethylsilylindenyl)zirconium dichloride, (1,1'-dimethylsilyleneindenyl)(2,2'-diisopropylsilylene-3-trimethylsilylindenyl)zirconium dichloride, (1,1'-dimethylsilyleneindenyl)(2,2'-dimethylsilylene-3-trimethylsilylmethylindenyl)zirconium dichloride, (1,1'-diphenylsilyleneindenyl)(2,2'-dimethylsilylene-3-trimethylsilylmethylindenyl)zirconium dichloride, (1,1'-dimethylsilyleneindenyl)(2,2'-diphenylsilylene-3-trimethylsiylmethylindenyl)zirconium dichloride, (1,1'-diisopropylsilyleneindenyl)(2,2'-dimethylsilylene-3-trimethylsilylmethylindenyl)zirconium dichloride, (1,1'-dimethylsilyleneindenyl)(2,2'-diisopropylsilylene-3-trimethylmethylsilylindenyl)zirconium dichloride, (1,1'-diisopropylsilyleneindenyl)(2,2'-diisopropylsilylene-3-trimethylsilylindenyl)zirconium dichloride and the like as well as the compounds, in which zirconium is replaced with titanium or hafnium. Of course, the transition metal compounds are not limited to these. Analogous compounds of metal elements in other groups or lanthanoid series may be also used.

In the compounds above, (1,1'-) and (2,2'-) positions may be (1,2'-) and (2,1'-) positions, and (1,2'-) and (2,1'-) positions may be (1,1'-) and (2,2'-) positions, respectively.

Any compound, which reacts with the transition metal compound of component (a) above capable of forming an ionic complex can be used as component (b-1) among components (b), but the compounds represented by the following general formula (III) and (IV) are preferably used.

$$([L^1-R^{10}]^{k+})_a([Z]^-)_b \quad (III)$$

$$([L^2/k^+])_a([Z]^-)_b \quad (IV)$$

(Wherein in which $L^2$ is $M^2$, $R^{11}R^{12}M^3$, $R^{13}{}_3C$ or $R^{14}M^3$), (In the formulas (III) and (IV), $L^1$ indicates a Lewis base and $[Z]^-$ indicates uncoordinated anions $[Z^1]^-$ and $[Z^2]^-$, in which $[Z^1]^-$ indicates anions of a plurality of groups linked with an element, that is, $[M^1G^1G^2\ldots G^f]^-$, (wherein $M^1$ indicates elements in groups 5 to 15 in periodic table, preferably elements in groups 13 to 15 in periodic table. $G^1$-$G^f$ each indicates a hydrogen atom, halogen atom, $C_1$-$C_{20}$ alkyl, $C_2$-$C_{40}$ dialkylamino, $C_1$-$C_{20}$ alkoxy, $C_6$-$C_{20}$ aryl, $C_6$-$C_{20}$ aryloxy, $C_7$-$C_{40}$ alkylaryl, $C_7$-$C_{40}$ arylalkyl, $C_1$-$C_{20}$ halogen-substituted hydrocarbon, $C_1$-$C_{20}$ acyloxy, organic metalloid or $C_2$-$C_{20}$ heteroatom-containing hydrocarbon. Two or more of $G^1$-$G^f$ may be linked to form a ring. f indicates an integer of [(valency of central atom $M^1$)+1].) and $[Z^2]^-$ indicates a Broensted acid by itself with a logarithm of a reciprocal of an acid dissociation constant (pKa) to be −10 or less, a conjugate base of a combination of a Broensted acid with a Lewis acid or a conjugate base of an acid generally defined as a superacid. A Lewis base may be coordinated. $R^{10}$ indicates a hydrogen atom, $C_1$-$C_{20}$ alkyl, $C_6$-$C_{20}$ aryl, alkylaryl or arylalkyl and $R^{11}$ and $R^{12}$ each indicate cyclopentadienyl, substituted cyclopentadienyl, indenyl or fluorenyl and $R^{13}$ indicates a $C_1$-$C_{20}$ alkyl, aryl, alkylaryl or arylalkyl. $R^{14}$ indicates a macrocyclic ligand such as tetraphenylporphyrin, phthalocyanine and the like. k indicates an ion valency of $[L^1-R^{10}]$ and $[L^2]$ with an integer of 1 to 3, a indicates an integer of 1 or more and b=(k×a). $M^2$ includes elements in groups 1 to 3, 11 to 13 and 17 in periodic table and $M^3$ indicates elements in groups 7 to 12 in periodic table).

Specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline and the like, phosphines such as triethylphosphine, triphenylphosphine, diphenylphosphine and the like, thioethers such as tetrahydrothiophene and the like, esters such as ethyl benzoate and the like, nitriles such as acetonitrile, benzonitrile and the like.

Specific examples of $R^{10}$ include a hydrogen atom, methyl, ethyl, benzyl, trityl and the like and specific examples of $R^{11}$ and $R^{12}$ include cyclopentadienyl, methylcyclopentadienyl, ethylcyclopentadienyl, pentamethlcyclopentadienyl and the like.

Specific examples of $R^{13}$ include phenyl, p-tolyl, p-methoxyphenyl and the like and specific examples of $R^{14}$ include tetraphenylporphyrin, phthalocyanine, allyl, methallyl and the like.

Specific examples of $M^2$ also include $L^1$, Na, K, Ag, Cu, Br, I, $I_3$ and the like and specific examples of $M^3$ include Mn, Fe, Co, Ni, Zn and the like.

Specific examples of $M^1$ in $[Z^1]^-$, that is, $[M^1G^1G^2 \ldots G^f]$ include B, Al, Si, P, As, Sb and the like, preferably B and Al. Specific examples of $G^1$, $G^2$-$G^f$ include dimethylamino, diethylamino and the like as a dialkylamino group, methoxy, ethoxy, n-butoxy, phenoxy and the like as an alkoxy or aryloxy group, methyl, ethyl, n-propyl, isopropyl, n-butyl, isobutyl, n-octyl, n-eicosyl, phenyl, p-tolyl, benzyl, 4-t-butylphenyl, 3,5-dimethylphenyl and the like as a hydrocarbon group, fluorine, chlorine, bromine or iodine as a halogen atom, p-fluorophenyl, 3,5-difluorophenyl, pentachlorophenyl, 3,4,5-trifluorophenyl, pentafluorophenyl, 3,5-bis(trifluoromethyl)phenyl, bis(trimethylsilyl)methyl and the like as a heteroatom-containing hydrocarbon group and pentamethylantimonyl, trimethylsilyl, trimethylgermyl, diphenylarsenyl, dicyclohexylantimonyl, diphenylboronyl and the like as an organometalloid.

Specific examples of uncoordinated anions $[Z^2]^-$, that is, a Broenstead acid by itself with pKa of –10 or less or a conjugate base of a combination of a Broenstead acid with a Lewis acid include a trifluoromethanesulfonate anion $(CF_3SO_3)^-$, a bis(trifluoromethanesulfonyl)methyl anion, a bis(trifluoromethanesulfonyl)benzyl anion, a bis(trifluoromethanesulfonyl)amide, a perchlorate anion $(ClO_4)^-$, a trifluoroacetate anion $(CF_3CO_2)^-$, a hexafluoroantimonate anion $(SbF_6)^-$, a fluorosulfonate anion $(FSO_3)^-$, a chlorosulfonate anion $(ClSO_3)^-$, a fluorosulfonate anion/antimonyl pentafluoride $(FSO_3/SbF_5)^-$, a fluorosulfonate anion/arsenyl pentafluoride $(FSO_3/AsF_5)^-$, a trifluoromethanesulfonic acid/antimonyl pentafluoride $(CF_3SO_3/SbF_5)^-$, and the like.

Specific examples of ionic compounds to react with the transition metal compounds of component (a) above to form an ionic complex, that is, compounds of component (b-1) include triethylammonium tetraphenylborate, tri-n-butylammonium tetraphenylborate, trimethylammonium tetraphenylborate, tetraethylammonium tetraphenylborate, methyl (tri-n-butyl)ammonium tetraphenylborate, benzyl(tri-n-butyl)ammonium tetraphenylborate, dimethyldiphenylammonium tetraphenylborate, triphenyl (methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis (pentafluorophenyl)borate, triphenylammonium tetrakis (pentafluorophenyl)borate, tetra(n-butyl)ammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl) phenyl]borate, ferrocenium tetraphenylborate, silver tetraphenylborate, trityl tetraphenylborate, tetraphenylporphyrin manganese tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrin manganese tetrakis(pentafluorophenyl)borate, silver tetrafluoroborate, silver hexafluorophosphate, silver hexafluoroarsenate, sliver perchlorate, silver trifluoroacetate, silver trifluoromethanesulfonate and the like. Such components (b-1) may be used in one kind or in combination of two kinds or more.

On the other hand, aluminoxanes in component (b-2) include a linear aluminoxane represented by the general formula (V),

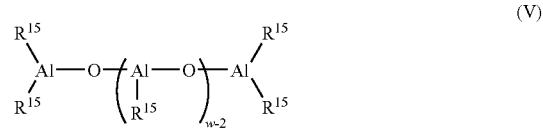

(V)

(Wherein $R^{15}$ indicates hydrocarbon groups such as $C_1$-$C_{20}$ hydrocarbons, preferably $C_1$-$C_{12}$ alkyls, alkenyls, aryls, arylalkyls or halogen atoms and w indicates an average degree of polymerization with an integer of generally 2 to 50, preferably 2 to 40. Each $R^{15}$ may be the same or different.) and a cyclic aluminoxane represented by the general formula (VI),

(VI)

(Wherein, $R^{15}$ and w are the same as those in the general formula (IV) above).

A method to manufacture the aluminoxanes above comprises contacting an alkylaluminum with a condensing agent such as water and the like, but its method is not particularly limited and the reaction according to a known method can be carried out. For example, there are methods of (1) dissolving organoaluminum compounds in an organic solvent, followed by contacting with water, (2) adding the organoaluminum compounds in an initial phase of polymerization, followed by addition of water, (3) reacting the organoaluminum compounds with crystal water contained in a metal salt or absorbed water in inorganic or organic compounds or (d) reacting a tetralkyldialuminoxane with a trialkylaluminum, followed by reaction with water. Aluminoxanes may be insoluble in toluene. Such aluminoxanes may be used in one kind or in combination of two kinds or more.

A mole ratio of catalyst component (a) and catalyst component (b) used is preferably in a range from 10:1 to 1:100, more preferably 2:1 to 1:10, when compound (b-1) is used as catalyst component (b), and a catalyst cost per polymer unit mass is not very high and practical when used in the above range.

A mole ratio is in a range from preferably 1:1 to 1:1000000, more preferably 1:10 to 1:10000 when compound (b-2) is used. A catalyst cost per polymer unit mass is not very high and practical when used in the above range.

Components (b-1) and (b-2) as catalyst component (b) may be used in one kind or in combination of two kinds or more.

Organoaluminum compounds as component (c) in addition to component (a) and component (b) above may be used as a polymerization catalyst for manufacturing higher α-olefin polymers in the present invention.

Compounds represented by the general formula (VII) can be herein used as an organoaluminum compound of component (c).

(wherein $R^{16}$ indicates a $C_1$-$C_{10}$ alkyl, J indicates a hydrogen atom, $C_1$-$C_{20}$ alkoxy, $C_6$-$C_{20}$ aryl or halogen atom and v is an integer of 1 to 3).

Specific examples of the compounds represented by the general formula (VII) above include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride and the like. Such organoaluminum compounds may be used in one kind or in combination of two kinds or more.

In manufacturing a higher α-olefin polymer related to the present invention, component (a), component (b) and component (c) above may be preliminarily contacted. Preliminary contact can be carried out by contacting component (a), for example, with component (b), but the method is not particularly limited and carried out according to a known method. Preliminary contact is effective in reduction of catalyst cost through improvement of catalyst activity and reduction of a usage ratio of component (b) as a promoter. Furthermore, in addition to the above effect, contact of component (a) with component (b-2) is also found to be effective for increasing the molecular weight. The preliminary contact temperature is generally −20° C. to 200° C., preferably −10° C. to 150° C., more preferably 0° C. to 80° C. Aliphatic hydrocarbons, aromatic hydrocarbons and the like can be used as an inert hydrocarbon solvent in preliminary contact. Among them, aliphatic hydrocarbons are particularly preferred.

A mole ratio of catalyst component (a) to catalyst component (c) used is in a range from preferably 1:1 to 1:10000, more preferably 1:5 to 1:2000, further more preferably 1:10 to 1:1000.

Use of said catalyst component (c) improves polymerization activity per unit transition metal and keeping a usage ratio within the above range prevents the organoaluminum compounds from wasting and leaving a large quantity thereof in α-olefin polymers.

The side-chain crystalline polyolefin-based polymers used in the present invention are manufactured using the polymerization catalyst described above by homopolymerization of higher α-olefins having 10 or more carbon atoms, polymerization of two kinds or more of higher α-olefins having 10 or more carbon atoms or polymerization of a higher α-olefin having 10 or more carbon atoms and an α-olefin having 9 or less carbon atoms.

A polymerization method in this case is not particularly limited and any of methods among a slurry polymerization method, a vapor phase polymerization method, a bulk polymerization method, a solution polymerization method, a suspension polymerization method and the like can be used, but a bulk polymerization method and a solution polymerization method are particularly preferred.

As for a polymerization condition, a polymerization temperature is generally −100 to 250° C., preferably −50 to 200° C., more preferably 0 to 130° C. A usage ratio of a catalyst relative to the reaction raw materials is preferably 1 to $10^8$, particularly 100 to $10^5$ in a ratio of the raw material monomer/component (a) above (mole ratio). Further, a polymerization time is generally in a range from 5 minutes to 10 hours and a polymerization pressure is preferably from atmospheric pressure to 20 MPa (gauge), more preferably from atmospheric pressure to 10 MPa (gauge).

In the manufacture of the higher α-olefin polymer used in the invention, the addition of hydrogen is preferable, because the polymerization activity is improved. When hydrogen is used, the pressure is generally from atmospheric pressure to 5 MPa (gauge), preferably from atmospheric pressure to 3 MPa (gauge), and more preferably from atmospheric pressure to 2 MPa (gauge), A method to regulate a molecular weight of the polymers includes selection of kinds and amount of each catalysts used and polymerization temperature as well as polymerization in the presence of hydrogen. Inert gas such as nitrogen may also be present.

When polymerization solvents are used, for example, aromatic hydrocarbons such as benzene, toluene, xylene, ethylbenzene and the like, alicyclic hydrocarbons such as cyclopentane, cyclohexane, methylcyclohexane and the like, aliphatic hydrocarbons such as pentane, hexane, heptane, octane and the like and halogenated hydrocarbons such as chloroform, dichloromethane and the like can be used. Such solvents may be used singly in one kind or in combination of two kinds or more. Monomers such as α-olefins and the like may also be used as a solvent. A solvent-free process may be used depending on a polymerization method.

The side-chain crystalline polyolefin-based resin of component (A) can be manufactured, in addition to the catalysts described above, using a Ziegler type catalyst comprising a solid catalyst component (d) and an organoaluminum compound (e).

Solid catalyst component (d) contains magnesium, titanium and as needed an electron donating compound and contains a magnesium compound (d-1) such as dimethylmagnesium, diethylmagnesium, diethoxymagnesium, magnesium chloride and the like, a titanium compound (d-2) such as tetramethoxytitanium, titanium tetrachloride and the like and an oxygen-containing electron donor (d-3) such as alcohols, phenols, ketones, aldehydes, carboxylic acids, malonic acid, esters of organic or inorganic acids and ethers such as monoethers, diethers, polyethers and the like as needed. Among them, diesters of polycarboxylic acids such as dibutyl phthalate are preferred. A chlorinating agent such as silicon tetrachloride and the like may be added in manufacturing the solid catalyst component.

An organoaluminum compound of component (e) includes triethylaluminum, triisobutylaluminum and the like. The organoaluminum compound may be used in one kind or in combination of two kinds or more.

Electron donating compounds (f) may be added as a third component to the Ziegler type catalyst above as needed. Components (f) include organosilicon compounds such as dicyclopentyldimethoxysilane, cyclohexylmethyldimethoxysilane, cyclohexylisobutyldimethoxysilane and the like.

An amount of each catalyst components in the Ziegler type catalyst above used is not particularly limited, but generally in a range from 0.00005 to 1 mmol based on titanium atom per liter of reaction volume for solid catalyst component (d) and in a range from 1 to 1000, preferably 10 to 500 of an aluminum/titanium ratio (atomic ratio) for organoaluminum compound (e). When such a atomic ratio is kept within the above range, enough catalyst activity is obtained. When an electron donating compound such as organosilicon compound and the like is used as third component (f), a ratio of electron donating compound (f) to organoaluminum compound (e) (mole ratio) used is generally in a range from 0.001 to 5.0, preferably 0.01 to 2.0, more preferably 0.05 to 1.0. When such a mole ratio is kept within the above range, enough catalyst activity is obtained.

Prepolymerization of an α-olefin may be firstly carried out as needed and then main polymerization may follow in manufacturing a higher α-olefin polymer used in the present invention. A polymerization method in the main polymerization is not particularly limited, but any method including solution polymerization, slurry polymerization, bulk polymerization and the like may be applied, either batch polymerization or continuous polymerization may be further applied and either a two step polymerization or multi-step polymerization may also be applied under different conditions.

As for the reaction condition, a polymerization pressure is not particularly limited, but generally in a range from atmospheric pressure to 8 MPa, preferably 0.2 to 5 MPa in terms of polymerization activity, while a polymerization temperature is generally appropriately chosen in a range from 0 to 200° C., preferably in a range from 30 to 100° C. A polymerization time cannot be uniformly set because it depends on kinds of α-olefins and polymerization temperature, but generally in a range from 5 minutes to 20 hours, preferably 10 minutes to 10 hours.

A molecular weight can be regulated by addition of a chain transfer agent, preferably addition of hydrogen. An inert gas such as nitrogen and the like may also be present.

In water dispersible composition I of the present invention, a content of the side-chain crystalline resin of component (A) has to be 5 to 70% by mass, preferably 10 to 60% by mass relative to a sum of components (A) and (B). When a content of component (A) is 5% by mass or more, a ratio of the side-chain crystalline resin to water in water dispersible composition I is appropriate to allow drying in a short period of time after applying water dispersible composition I of the present invention to a base material. When it is 70% by mass or less, water dispersible composition I exhibits sufficient flowability to provide superior working efficiency in application of water dispersible composition I to a base material and allow forming a coating film with a flat and smooth surface.

Purified water or tap water may be used as water of component (B) used in the present invention. A content of water of component (B) has to be 95 to 30% by mass, preferably 90 to 40% by mass relative to a sum of components (A) and (B).

Non-ionic surfactants or anionic surfactants are preferably used as a surfactant of component (C) used in the present invention because of better storage stability of water dispersible composition I. Non-ionic surfactants include, for example, polyoxyethylene alkyl ethers such as polyoxyethylene lauryl ether, polyoxyethylene octylphenyl ether, polyoxyethylene nonylphenyl ether and the like, polyoxyethylene alkylphenyl ether, polyoxyethylene sorbitan fatty acid esters such as polyoxyethylene sorbitan monolaurate, polyoxyethylene sorbitan monooleate and the like, polyoxyethylenepolyoxypropylene block copolymer with an amount of 10 to 80% by mass of ethylene oxide added as well as polyalkylene glycol-based surfactants, fatty acid ester-based surfactants and the like.

Anionic surfactants include, for example, sodium laurylsulfate, sodium dodecylbenzenesulfate, sodium dialkylsulfosuccinate, sodium polyoxyethylene alkyl ether sulfate, sodium polyoxyethylene alkylphenyl ether sulfate as well as methyl taurine salts, ether sulfonate salts, phosphoric acid ester salts and the like.

Cationic surfactants such as quaternary ammonium salts, amine salts and the like and amphoteric surfactants may also be used.

In water dispersible composition I of the present invention, a content of a surfactant of component (C) has to be 0.01 to 5 parts by mass, preferably 0.01 to 1 part by mass, more preferably 0.01 to 0.6 part by mass relative to 100 parts by mass of a sum of components (A) and (B). When a content of component (C) is 0.01 part by mass or more, water dispersible composition I with higher storage stability can be obtained. When it is 5 parts by mass or less, an adverse effect of the surfactant on performance of water dispersible composition I can be prevented in its use for desired application. For example, when the amount exceeding one part by mass of the surfactant is used, characteristics of the surfactant could lead to stickiness on a surface of the base material which was applied with water dispersible composition I and dried.

A water soluble polymer compound may be added as component (D) to water dispersible composition I of the present invention. Various water soluble polymer compounds can be used as a protective colloid. Protective colloids include poly(meth)acrylate salts such as sodium polyacrylate and the like, polyvinyl alcohol, partially saponified polyvinyl alcohol as well as cellulosic derivatives such as methylcellulose, hydroxyethylcellulose and the like.

Polyvinyl alcohols include, common partially saponified polyvinyl alcohol, completely saponified polyvinyl alcohol and modified type polyvinyl alcohols such as sulfonic acid-modified polyvinyl alcohols, carboxyl-modified polyvinyl alcohols, silanol-modified polyvinyl alcohols, acetoacetylated polyvinyl alcohols and the like.

In water dispersible composition I of the present invention, a content of the water soluble polymer compound of component (D) is generally 0.01 to 1 part by mass, preferably 0.01 to 0.6 part by mass relative to 100 parts by mass of a sum of components (A) and (B). When a content of component (D) is 0.01 part by mass or more, water dispersible composition I with higher storage stability can be obtained. When it is 1 part by mass or less, an adverse effect of the water soluble polymer compound on performance of water dispersible composition I can be prevented in its use for desired application. For example, when the amount exceeding one part by mass of the water soluble polymer compound is used, characteristics of the water soluble polymer compound could lead to stickiness on a surface of the base material which was applied with water dispersible composition I and dried. The water soluble polymer compound encapsulates emulsion particles in water dispersible composition I to contribute to storage stability of water dispersible composition I.

A water insoluble organic solvent may be added as component (E) to water dispersible composition I of the present invention. Water insoluble organic solvents include, for example, hydrocarbon-based organic solvents such as pentane, hexane, heptane, cyclohexane, methylcyclohexane, toluene, xylene, benzene and the like. Aliphatic-based organic solvents such as pentane, hexane, heptane, cyclohexane, methylcyclohexane and the like are particularly preferred in terms of safety and health.

In water dispersible composition I of the present invention, a content of the water insoluble organic solvent of component (E) is generally in a range from 2 to 200 parts by mass relative to 100 parts by mass of a sum of components (A) and (B). When a content of component (E) is 2 parts by mass or more, water dispersible composition I with higher storage stability can be obtained. When it is 200 parts by mass or less, working efficiency can also be improved because water dispersible composition I is easier to dry after application. Addition of component (E) prevents component (A) constituting water dispersible composition I from crystallization and makes it easier to form a flat and smooth film when water dispersible composition I is applied to a base material.

A water dispersible polyolefin-based resin composition of the present invention (hereinafter optionally referred to simply as "water dispersible composition II") comprises a combination of 5 to 80% by mass of a modified side-chain crystalline polyolefin-based resin (G) with 95 to 20% by mass of water (B), in which the side-chain crystalline olefin-based polymer obtained by (i) polymerization of higher α-olefins having 10 or more carbon atoms or (ii) polymerization of one kind or more of a higher α-olefin having 10 or more carbon atoms and one kind or more of an α-olefin with a number of carbon atoms of 9 or less and comprising 50 mol % or more of said higher α-olefin unit is modified with a radical initiator and an organic acid, organic acid anhydride or organic acid ester.

The side-chain crystalline olefin polymer of (i) or (ii) in component (G) is the same as those in (i) or (ii) in component (A) described above. The modified side-chain crystalline polyolefin-based resin of component (G) is obtained by denaturing such a side-chain crystalline olefin-based polymer with a radical initiator and an organic acid, organic acid anhydride or organic acid ester.

A radical initiator is not particularly limited, but conventionally known radical initiators, for example, various organic peroxides and azo compounds such as azobisisobutyronitrile, azobisisovaleronitrile and the like may be appropriately selected to use and among them, organic peroxides are preferred.

Such organic peroxides includes, for example, diacyl peroxides such as dibenzoyl peroxide, di-3,5,5-trimethylhexanoyl peroxide, dilauroyl peroxide, didecanoyl peroxide, di(2,4-dichlorobenzoyl) peroxide and the like, hydroperoxides such as t-butylhydroperoxide, cumenehydroperoxide, diisopropylbenzenehydroperoxide, 2,5-dimethylhexane-2,5-dihydroperoxide and the like, dialkyl peroxides such as di-t-butyl peroxide, dicumyl peroxide, 2,5-dimethyl-2,5-di(t-butylperoxy)hexane, 2,5-dimethyl-2,5-di(t-butylperoxy)hexyne-3, α,α'-bis(t-butylperoxy)diisopropylbenzene and the like, peroxy ketals such as 1,1-bis(t-butylperoxy)-3,3,5-trimethylcyclohexane, 2,2-bis(t-butylperoxy)butane and the like, alkyl peresters such as t-butyl peroxyoctoate, t-butyl peroxypivalate, t-butyl peroxyneodecanoate, t-butyl peroxybenzoate and the like, peroxycarbonates such as di-2-ethylhexyl peroxydicarbonate, diisopropyl peroxydicarbonate, di-sec-butyl peroxydicarbonate, t-butylperoxy isopropyl carbonate and the like. Among them, dialkyl peroxides are preferred. These may be used singly in one kind or in combination of two kinds or more.

Specific commercial products of such organic peroxides include, for example, from NOF Corporation, PERHEXYNE 25B, PERBUTYL D, PERBUTYL C, PERHEXA 25B, PERCUMYL D, PERBUTYL P, PERBUTYL H, PERHEXYL H, PERCUMYL H, PEROCTA H, PERCUMYL P, PERMENTA H, PERBUTYL SM, PERMEK N, PEROMER AC, PERHEXA V, PERHEXA 22, PEEHEXA CD, PERTETRA A, PERHEXA C, PERHEXA 3M, PERHEXA 3M-95, PERHEXA HC, PERHEXA TMH, PERBUTYL IF, PERBUTYL Z, PERBUTYL A, PERHEXYL Z, PERHEXA 25Z, PERBUTYL E, PERBUTYL L, PERHEXA 25MT, PERBUTYL I, PERBUTYL 355, PERBUTYL MA, PERHEXYL I, PERBUTYL IB, PERBUTYL O, PERHEXYL O, PERCYCLO O, HERHEXA 250, PEROCTA O, PERBUTYL PV, PERHEXYL PV, PERBUTYL ND, PERHEXYL ND, PERCYCLO ND, PEROCTA ND, PERCUMYL ND, DYPER ND, PEROYL SOP, PEROYL OPP, PEROYL MBP, PEROYL EEP, PEROYL IPP, PEROYL NPP, PEROYL TCP, PEROYL IB, PEROYL SA, PEROYL S, PEROYL O, PEROYL L, PEROYL 355, NYPER BW, NYPER BMT, NYPER CS and the like.

Organic acids, organic acid anhydrides or organic acid esters include (meth)acrylate esters such as methyl acrylate, ethyl acrylate, propyl acrylate, butyl acrylate, amyl acrylate, hexyl acrylate, heptyl acrylate, octyl acrylate, 2-ethylhexyl acrylate, decyl acrylate, lauryl acrylate, stearyl acrylate, methyl methacrylate, ethyl methacrylate, propyl methacrylate, butyl methacrylate, amyl methacrylate, hexyl methacrylate, 2-ethylhexyl methacrylate, decyl methacrylate, lauryl methacrylate, stearyl methacrylate and the like and α, β-ethylenic unsaturated carboxylic acids and their anhydrides such as acrylic acid, methacrylic acid, crotonic acid, itaconic acid, maleic acid, fumaric acid, maleic anhydride and the like.

An amount of the radical initiator and an organic acid, organic acid anhydride or organic acid ester used is not particularly limited, but appropriately selected according to desired physical properties of the modified side-chain crystalline polyolefin-based resin targeted and the radical initiator used is generally in a range from 0.01 to 10 parts by mass, preferably 0.01 to 5 parts by mass relative to 100 part by mass of the side-chain crystalline polyolefin-based polymer used, while the organic acid, organic acid anhydride or organic acid ester used is generally in a range from 0.1 to 50 parts by mass, preferably 0.1 to 30 parts by mass.

A denaturing treating method is not particularly limited, but the side-chain crystalline polyolefin-based polymer can be modified, for example, by a method to melt and knead the side-chain crystalline olefin-based polymer with the radical initiator above and the organic acid, organic acid anhydride or organic acid ester above at a temperature in a range from 150 to 300° C., preferably in a range from 150 to 250° C. to react for 0.01 to 0.5 hour using a roll mill, Banbury mixer, extruder and the like or a method to react in an appropriate solvent such as hydrocarbon solvents such as butane, pentane, hexane, heptane, cyclohexane, toluene and the like, halogenated hydrocarbon solvents such as chlorobenzene, dichlorobenzene, trichlorobenzene or liquefied α-olefins or under a solvent-free condition at a temperature in a range from −50 to 300° C., preferably 40 to 180° C. for approximately 0.1 to 2 hours.

A content of the organic acid, organic acid anhydride or organic acid ester above in the modified side-chain crystalline polyolefin-based resin is preferably in a range from 5 to 25% by mass, more preferably 8 to 20% by mass. When this content is 5% by mass or more, storage stability is improved. On the other hand, when it is 25% by mass or less, viscosity of water dispersible composition II is not excessively high but appropriate, improving workability in application of water dispersible composition II.

In water dispersible composition II of the present invention, a content of the modified side-chain crystalline polyolefin-based resin of component (G) has to be 5 to 80% by mass, preferably 15 to 60% by mass relative to a sum of components (B) and (G). When a content of component (G) is 5% by mass or more, water dispersible composition II of the present invention can be dried within a short period of time after application to a base material because a ratio of the modified side-chain crystalline polyolefin-based resin to water in water dispersible composition II becomes appropriate. When it is 80% by mass or less, working efficiency in application of water dispersible composition II to a base material is high to yield a coating film with a flat and smooth surface because water dispersible composition II exhibits enough flowability.

Purified water or tap water can be used as water of component (B) of the present invention. In water dispersible composition II of the present invention, a content of water of component (B) has to be 95 to 20% by mass, preferably 85 to 40% by mass relative to a sum of components (B) and (G).

Differing from component (A), component (G) has affinity to water, so that a combination of component (G) and component (B) alone yields water dispersible composition II with excellent storage stability.

A water soluble basic substance may be added as component (F) to water dispersible composition II above in addition to component (G) and component (B). When the water soluble basic substance is added upon mixing the modified side-chain crystalline polyolefin-based resin with water, water dispersible composition II can be neutralized. The water soluble basic substances include hydroxide compounds such as sodium hydroxide, potassium hydroxide, lithium hydroxide and the like.

In water dispersible composition II of the present invention, a content of the water soluble basic substance of component (F) is generally in a range from 0.01 to 1 part by mass relative to 100 parts by mass of a sum of components (G) and (B). When a content of component (F) is 0.01 part by mass or more, a water dispersible composition with excellent storage stability can be obtained. When it is 1 part by mass or less, the basic substance also has no adverse effect on its performance in use of water dispersible composition II for various applications.

One kind or more selected from surfactants (C), water soluble polymer compounds (D) and water insoluble organic solvents (E) can also be formulated. These are similar to those described above.

Water dispersible resin composition I comprising a side-chain crystalline resin (A), water (B) and a surfactant (C) can be manufactured as follows. That is, a mixed solution of component (C) dissolved in component (B) is mixed with component (A), for example, by stirring. In this case, a preferred method is to heat component (A) to dissolve and reduce viscosity and then mix with the mixed solution above. This mixing is preferably carried out by stirring at a temperature range of 50 to 90° C. because it contributes to dissolution of component (A) and viscosity reduction. When water soluble polymer compound (D) is formulated, component (D) together with component (C) is dissolved in water of component (B).

Water dispersible composition I comprising a side-chain crystalline resin (A), water (B), a surfactant (C) and a water insoluble organic solvent (E) can be manufactured as follows. That is, a mixed solution of component (A) dissolved in component (E) is poured into a mixed solution of component (C) dissolved in component (B) to mix, for example, by stirring. In this case, stirring similarly to the above at a temperature range of 50 to 90° C. is preferred since this contributes to dissolution of the component (A) and viscosity reduction. Component (E) may be distilled off after manufacturing the water dispersible resin composition. When a water soluble polymer compound (D) is further formulated, component (D) together with component (C) is dissolved in water of component (B).

Water dispersible composition II comprising the modified side-chain crystalline polyolefin-based resin (G) and water (B) is manufactured as follows. That is, component (G) is mixed with component (B), for example, by stirring. In this case, a preferred method is to heat component (G) to dissolve and reduce viscosity and then mix with component (B). This mixing is preferably carried out by stirring at a temperature range of 50 to 90° C., since this contributes to dissolution of component (G) and viscosity reduction. When one kind or more selected from a surfactant (C), a water soluble basic substance (F) and a water soluble polymer compound (D) is further formulated, one kind or more selected from component (C), component (D) and component (E) is dissolved in water of component (B).

Water dispersible composition II comprising the modified side-chain crystalline polyolefin-based resin (G), water (B) and a water insoluble organic solvent (E) is manufactured as follows. That is, a mixed solution of component (G) dissolved in component (E) is poured into component (B) to mix, for example, by stirring. In this case, stirring similar to the above at a temperature range of 50 to 90° C. is preferred, since this contributes to dissolution of component (G) and viscosity reduction. Component (E) may be distilled off after manufacturing the water dispersible resin composition. When one kind or more selected from a surfactant (C), a water soluble basic substance (F) and a water soluble polymer compound (D) is further formulated, one kind or more selected from component (C), component (D) and component (E) is dissolved in water of component (B).

A method to stir under shear force is suitable as an agitation method and a method to manufacture water dispersible compositions I and II at high temperature and high pressure under shear force is preferred. As a method to yield water dispersible compositions I and II by applying shear force, a method to use an extruder heated to 50 to 300° C. can be employed. In this case, a temperature condition exceeding 100° C. can be employed since shear force can be applied under pressure. Agitation can be carried out using a homogenizer at a rotational frequency of 5000 to 20000 rpm and a temperature condition of 0 to 90° C. for approximately 30 seconds to 2 hours.

Common coaters, printing machines, sprayers and the like may be used when water dispersible compositions I and II of the present invention are applied to a surface of a base material such as plastics, paper, metals and the like. After application, the base material is heated at a heat resistant temperature or lower or blown with air or nitrogen to dry the coating film.

EXAMPLES

The present invention is next described in more detail according to Examples, but not limited by these examples in any way. Physical properties of each example were measured with the methods below.

(1) Melting point (Tm) and Half Width of Melting Peak (Wm)

Using a differential scanning calorimeter (Perkin Elmer Model DSC-7), 10 mg of a sample was kept at −10° C. for 5 minutes under nitrogen atmosphere to elevate a temperature at a rate of 10° C./min, further kept at 190° C. for 5 minutes and then lowered a temperature at a rate of 5° C./min to −10° C., kept at −10° C. for 5 minute and then elevated a temperature to 190° C. at a rate of 110° C./min to yield a melting endothermic curve, in which a temperature of the peak top in the maximum peak was assigned as a melting point (Tm). A peak width at a midpoint of a height from a baseline of a whole melting curve to a peak top during Tm measurement was assigned as a half width melting peak Wm.

(2) Weight Average Molecular Weight (Mw) and Molecular Weight Distribution (Mw/Mn)

Weight average molecular weight (Mw) and number average molecular weight (Mn) were measured by gel permeation chromatography (GPC) with the following apparatus and condition.

Apparatus for GPC Measurement
  Column: TOSO GMHHR-H(S)HT
  Detector: Refractive index (RI) detector for liquid chromatography, WATERS 150 C Measurement Condition
  Solvent: 1,2,4-Trichlorobenzene
  Measurement temperature: 145° C.
  Flow rate: 1.0 m/min
  Sample concentration: 2.2 mg/ml
  Injection volume: 160□l
  Calibration curve: Universal Calibration
  Analysis program: HT-GPC (Ver. 1.0)

(1) Peak (X1) and Number of Peaks

Peaks (X1) derived from side-chain crystallization observed in 15 degrees<2θ<30 degrees in measurement of the wide angle x-ray scattering intensity distribution were measured. The wide angle x-ray scattering (WAXS) intensity distribution was measured using an anode Rotaflex RU-200x-ray generator manufactured by Rigaku Corporation by collimating monochromatic light of a CuKα line (wavelength=1.54 Å) with an output of 30 kV and 100 mA through a pin hole of a diameter φ=2 mm and exposing for 1 minute using a position sensitive proportional counter. The number of peaks is the number of peak (X1) lines.

Manufacture Example 1

Manufacture of (1,2'-dimethylsilylene)(2,1'-dimethylsilylene)-bis(3-trimethylsilylmethylindenyl)zirconium dichloride 3.0 g (6.97 mmol) of a lithium salt of (1,2'-dimethylsilylene)(2,1'-dimethylsilylene)-bis(indene) was dissolved in 50 mL of THF (tetrahydrofuran) in a Schrenk tube. The solution was chilled to −78° C., and 2.1 ml (14.2 mmol) of iodomethyltrimethylsilane was gradually added dropwise to the solution and the solution was stirred at room temperature for 12 hours.

The solvent was evaporated to yield a residue, to which 50 ml of ether was added and washed with a saturated ammonium chloride aqueous solution.

After phase separation, the organic phase was dried and the solvent was evaporated to yield 3.04 g (5.88 mmol) of (1,2'-dimethylsilylene)(2,1'-dimethylsilylene)-bis(3-trimethylsilylmethylindene) (yield=84%).

To the Schrenk tube were added 3.04 g (5.88 mmol) of (1,2'-dimethylsilylene)(2,1'-dimethylsilylene)-bis(3-trimethylsilylmethylindene) obtained above and 50 ml of ether under nitrogen stream. The mixture was chilled to −78° C., to which a hexane solution of n-butyllithium (n-BuLi) (1.54 M, 7.6 ml (1.7 mmol)) was added dropwise. The mixture was allowed to warm to room temperature, stirred for 12 hours and then ether was evaporated. Solids obtained were washed with 40 ml of hexane to yield 3.06 g (5.07 mmol) of a lithium salt as an ether adduct (yield 73%). Results of a $^1$H-NMR (90 MHz, THF-d$_8$) measurement are as follows.

δ:0.04 l (s, 18H, trimethylsilyl), 0.48 (s, 12H, dimethylsilylene), 1.10 (t, 6H, methyl), 2.59 (s, 4H, methylene), 3.38 (q, 4H, methylene), 6.2-7.7 (m, 8H, Ar—H).

The lithium salt obtained was dissolved in 50 ml of toluene under nitrogen stream. This solution was chilled to −78° C., and 1.2 g (5.1 mmol) of zirconium tetrachloride suspended in toluene (20 ml) preliminarily chilled to −78° C. was added to the solution dropwise. After dropwise addition, the mixture was stirred at room temperature for 6 hours. The solvent of this reaction solution was evaporated. The residue obtained was recrystallized from dichloromethane to yield 0.9 g (1.33 mmol) of (1,2'-dimethylsilylene)(2,1'-dimethylsilylene)-bis(3-trimethylsilylmethylindenyl)zirconium dichloride (yield=26%). Results of a $^1$H-NMR (90 MHz, CDCl$_3$) measurement are as follows.

δ:0.0 (s, 18H, trimethylsilyl), 1.02, 1.12 (s, 12H, dimethylsilylene), 2.51 (dd, 4H, methylene), 7.1-7.6 (m, 8H, Ar—H).

Manufacture Example 2

To a heat-dried autoclave with an inner capacity of one liter equipped with a stirrer were added 244 mL of hexadecene-1 (Linealene 16 manufactured by Idemitsu Kosan Co., Ltd.) and 156 mL of octadecene-1 (Linealene 18 manufactured by Idemitsu Kosan Co., Ltd.) under a nitrogen stream, and then 0.25 mL of a heptane solution of triisobutylaluminum (2.0 mmol/mL) was poured to the mixture. The mixture was then stirred at 400 rpm to heat to 60° C., to which methylaluminoxane (Albermarle Corporation, 3.0 mmol calculated in terms of aluminum) and 31 mol (10 tμmol/mL of toluene solution, 0.3 mL) of (1,2'-dimethylsilylene)(2,1'-dimethylsilylene)-bis(3-trimethylsilylmethylindenyl) zirconium dichloride were added. After hydrogen was introduced at 0.09 MPa, the mixture was polymerized for 2 hours.

After completion of the polymerization, 3 mL of methanol was added to the reaction mixture to terminate the polymerization. After depressurized, the reaction mixture was poured into 400 mL of acetone to precipitate the polymer, followed by decanting supernatant to remove and heating under vacuum to dry at 150° C. for 8 hours to yield 89 g of a higher α-olefin polymer. Results in measurements of physical properties of the polymer obtained are shown in Table 1.

Manufacture Example 3

To a heat-dried autoclave with an inner capacity of one liter equipped with a stirrer was added 400 ml of octadecene-1 (Linealene 18 manufactured by Idemitsu Kosan Co., Ltd.) under nitrogen stream, and then 0.25 mL of a heptane solution of triisobutylaluminum (2.0 mmol/mL). The mixture was then stirred at 400 rpm to heat to 70° C., to which 2.0 mmol of (1,2'-dimethylsilylene)(2,1'-dimethylsilylene)-bis(3-trimethylsilylmethylindenyl)zirconium dichloride (10 μmol/mL of toluene solution, 0.2 mL) and 8 μmol of dimethylanilinium tetrakis(pentafluorophenyl)borate (20 μmol/mL of heptane slurry, 0.4 mL) were added. Hydrogen was then introduced at 0.05 MPa to polymerize for 1 hour.

After completion of the polymerization, 3 mL of methanol was added to the reaction mixture to terminate the polymerization. After depressurized, the reaction mixture was poured into 400 mL of acetone to precipitate the polymer, followed by decanting supernatant to remove and heating under vacuum to dry at 150° C. for 8 hours to yield 180 g of a higher α-olefin polymer. Results in measurements of physical properties of the polymer obtained are shown in Table 1.

TABLE 1

|  | Manufacture Example 2 | Manufacture Example 3 |
|---|---|---|
| Ratio of amount charged Linealene 16/Linealene 18 (vol/vol) | 61/39 | 0/100 |
| Tm (° C.) | 30.9 | 37 |
| Wm (° C.) | 2.2 | 2.3 |
| Mw | 121,000 | 80,200 |
| Mw/Mn | 1.8 | 1.8 |
| X1 (°) | 21.0 | 21.1 |
| Number of peaks (line) | 1 | 1 |

Example 1

To a beaker with an inner capacity of 100 mL were added 5.4 g of the copolymer manufactured in Manufacture Example 2 and 50 mL (34 g) of heptane to completely dissolve in a water bath at 60° C. Separately, to a beaker with an inner capacity of 300 mL were added 100 g of ion-exchanged water, 0.16 g of sodium dodecylbenzenesulfonate and 0.06 g of sodium polyacrylate to completely dissolve in a water bath at 60° C. 20 mL (20 g) of the separately prepared solution was added to the heptane solution of the copolymer above to stir at 13500 rpm for 1 minute using a homogenizer (D125) manufactured by IKA Japan Co., Ltd. to yield a water dispersible composition.

Example 2

To a beaker with an inner capacity of 100 mL were added 15.0 g of the polymer manufactured in Manufacture Example 3 and 3 mL (2.0 g) of heptane to completely dissolve in a water bath at 60° C. Separately, to a beaker with an inner capacity of 300 mL were added 100 g of ion-exchanged water, 0.16 g of sodium dodecylbenzenesulfonate and 0.06 g of sodium polyacrylate to completely dissolve in a water bath at 60° C. 35 mL (35 g) of the separately prepared solution was added to the heptane solution of the polymer above to stir at 13500 rpm for 1 minute using a homogenizer (D125) manufactured by IKA Japan Co., Ltd. to yield a water dispersible composition.

Example 3

To a beaker with an inner capacity of 100 mL, 6.0 g of the polymer manufactured in Manufacture Example 3 was added to completely dissolve in a water bath at 70° C. Separately, to a beaker with an inner capacity of 300 mL were added 100 g of ion-exchanged water, 0.16 g of sodium dodecylbenzenesulfonate and 0.06 g of sodium polyacrylate to completely dissolve in a water bath at 60° C. 30 mL (30 g) of the separately prepared solution was added to the polymer solution above to stir at 13500 rpm for 1 minute using a homogenizer (D125) manufactured by IKA Japan Co., Ltd. to yield a water dispersible composition.

Comparative Example 1

10.0 g of the poly α-olefin copolymer manufactured in Manufacture Example 2 was added to a beaker with an inner capacity of 100 mL to completely dissolve in a water bath at 60° C. 35 g of ion-exchanged water was added to the solution of the poly α-olefin copolymer and stirred at 13500 rpm for 3 minutes. However, the mixture was not dispersed and a water dispersible composition of the poly α-olefin copolymer was not obtained.

Manufacture Example 4

Preparation of Solid Catalyst Component

To a three-necked flask with an inner capacity of 5 L equipped with a stirrer and replaced with nitrogen was added 160 g of diethoxymagnesium and then 600 mL of dehydrated octane. The mixture was heated to 40° C. in an oil bath, and added 24 mL of silicon tetrachloride. After the mixture was stirred for 20 minutes. 16 mL of dibutyl phthalate was added to the mixture. The inside temperature was elevated to 80° C., and 770 mL of titanium tetrachloride was subsequently added dropwise from a dropping funnel.

After contacting for 2 hours at an inside temperature of 125° C., agitation was stopped to precipitate solids, from which a supernatant was withdrawn. 1000 mL of dehydrated octane was added to the mixture, and the mixture was heated to 125° C. with stirring and kept for 1 minute to stop the agitation and precipitate solids, from which a supernatant was withdrawn. Such a washing process was repeated seven times. 1220 mL of titanium tetrachloride was added to the mixture, and was contacted for 2 hours at the inside temperature of 125° C. Washing with dehydrated octane at 125° C. was subsequently repeated five times similarly as the above and washing with dehydrated octane at 30° C. was further repeated twice to yield a solid catalyst component.

Manufacture Example 5

Polymerization of Dodecene 400 mL of dodecene (Linealene 12 manufactured by Idemitsu Kosan Co., Ltd.) and then 8.0 mmol of triethylaluminum were added in this order at 25° C. to a stainless steel autoclave with an inner capacity of 1 L equipped with a stirrer and dried well and replaced with nitrogen gas. Agitation was initiated while keeping a temperature at 25° C. and hydrogen was charged into the mixture at 0.6 MPa, to which 20 mL of heptane, 0.2 mmol of cyclohexylisobutyldimethoxysilane (CyiBuSi) and 0.01 mole (calculated in terms of Ti atom) of the catalyst prepared in Manufacture Example 4 each taken into a catalyst addition tube replaced with nitrogen gas were added in the autoclave. The mixture in the autoclave was heated to 90° C. over about 10 minutes, and polymerization continued for 360 minutes while keeping this temperature.

20 mL of methanol was taken into the catalyst addition tube to add to the mixture in the autoclave to terminate the reaction, then the autoclave was depressurized to atmospheric pressure and cool to an room temperature to open the autoclave. The reaction solution was poured into 500 mL of acetone to precipitate the polymer, which was separated by decantation to dry under vacuum at 150° C. for 4 hours to yield the polymer.

Manufacture Example 6

Polymerization of Octadene 400 mL of octadecene (Linealene 18 manufactured from Idemitsu Kosan Co., Ltd.) and then 8.0 mmol of triethylaluminum were added in this order at 25° C. to a stainless steel autoclave with an inner capacity of 1 L equipped with a stirrer and dried well and replaced with nitrogen gas. Agitation was initiated while keeping the temperature at 25° C. and hydrogen was charged into the mixture at 0.6 MPa, to which 20 mL of heptane, 0.2 mmol of cyclohexylisobutyldimethoxysilane (CyiBuSi) and 0.01 mole (calculated in terms of Ti atom) of the catalyst prepared in Manufacture Example 4 each taken into a catalyst addition tube replaced with nitrogen gas were added in the autoclave. The autoclave was heated to 90° C. over about 10 minutes. Polymerization was continued for 360 minutes while keeping this temperature.

20 mL of methanol was taken into the catalyst addition tube to add to the autoclave to terminate the reaction. Then the autoclave was depressurized to atmospheric pressure and cooled to an room temperature to open the autoclave. The reaction solution was poured into 500 mL of acetone to precipitate the polymer, which was separated by decantation to dry under vacuum at 150° C. for 4 hours to yield the polymer.

TABLE 2

|  | Manufacture Example 5 | Manufacture Example 6 |
|---|---|---|
| Monomer | Linealene 12 | Linealene 18 |
| Tm (° C.) | 11.4, 36.9 | 36.4, 67.6 |
| Wm (° C.) | 11.4 | 9.2 |
| Mw | 173000 | 215000 |
| Mw/Mn | 4 | 4.4 |
| X1 (°) | 21.1 | 21.1 |
| Number of peaks (line) | 1 | 1 |

Example 4

To a beaker with an inner capacity of 100 mL were added 5.0 g of the polymer manufactured in Manufacture Example 5 and 15 mL (10.2 g) of heptane to completely dissolve in a water bath at 60° C. Separately, to a beaker with an inner capacity of 300 mL were added 100 g of ion-exchanged water, 0.16 g of sodium dodecylbenzenesulfonate and 0.06 g of sodium polyacrylate to completely dissolve in a water bath at 60° C. 10 mL (10 g) of the separately prepared solution was added to the heptane solution of the polymer above to stir at 13500 rpm for 1 minute using a homogenizer (D125) manufactured by IKA Japan Co., Ltd. to yield a water dispersible composition.

Example 5

To a beaker with an inner capacity of 100 mL were added 15.0 g of the polymer manufactured in Manufacture Example 6 and 3 mL (2.0 g) of heptane to completely dissolve in a water bath at 60° C. Separately, to a beaker with an inner capacity of 300 mL were added 100 g of ion-exchanged water, 0.16 g of sodium dodecylbenzenesulfonate and 0.06 g of sodium polyacrylate to completely dissolve in a water bath at 60° C. 10 mL (10 g) of the separately prepared solution was added to the heptane solution of the polymer above to stir at 13500 rpm for 1 minute using a homogenizer (D125) manufactured by IKA Japan Co., Ltd. to yield a water dispersible composition.

Manufacture Example 7

To a glass vessel with an inner capacity of 1 L equipped with a stirrer, two 20 mL dropping funnels and a Dimroth tube were added 50.0 g of the polymer manufactured in Manufacture Example 2 and 250 mL of toluene. The mixture was stirred at 110° C. To one dropping funnel, 12 mL of toluene and 0.2 g of a radical initiator (PERHEXA 3M-95 manufactured from NFO Corporation) were added while 12 mL of toluene and 12 g of acrylic acid were added to the other dropping funnel, and contents of both dropping funnels were then added dropwise at the same addition rate to a toluene solution of the polymer with stirring at 110° C. over 1 hour.

After completion of dropwise addition, the mixture was further stirred for 5 hours. The reaction solution was cooled to room temperature and then poured into 300 mL of acetone to give precipitates. The precipitates were isolated by a decantation method and washed twice with 300 mL of acetone. The precipitates were dried under vacuum at 80° C. to yield 53.4 g of an acrylic acid-modified copolymer. A weight average molecular weight (Mw) and a molecular weight distribution (Mw/Mn) of this acrylic acid-modified copolymer were 65,800 and 3.2, respectively.

Example 6

20.0 g of the acrylic acid-modified copolymer manufactured in Manufacture Example 7 was added to a beaker with an inner capacity of 100 mL to completely dissolve in a water bath at 60° C. A potassium hydroxide aqueous solution was prepared beforehand by dissolving 0.10 g of potassium hydroxide in 200 mL of water, and 14 mL of the solution was added to the above copolymer solution and stirred at 13500 rpm for 3 minutes using a homogenizer (D125) manufactured by IKA Japan Co., Ltd. to yield a water dispersible composition.

The water dispersible compositions obtained in Examples 1 to 6 and Comparative Example 1 were allowed to stand for one week to evaluate storage stability. The results are shown in Table 3.

TABLE 3

| Example 1 | Example 2 | Example 3 | Comparative Example 1 | Example 4 | Example 5 | Example 6 |
|---|---|---|---|---|---|---|
| Excellent | Excellent | Good | Poor | Excellent | Excellent | Good |

Note:
Excellent: No observation of any aggregates
Good: Aggregates are observed partially but fluid
Poor: Aggregated and not fluid Industrial Applicability Water dispersible compositions I and II of the present invention can be kept in a form of emulsion at room temperature and form a flat and smooth coating film with a solidified surface upon application to a base material because they are compositions of a side-chain crystalline resin with a low melting point or modified side-chain crystalline polyolefin-based resin being dispersed as fine particles in water. Water dispersible compositions I and II of the present invention can be used by applying to a surface of plastics, paper, metals and the like using common coaters, printing machines, sprayers and the like.

The invention claimed is:

1. A water dispersible resin composition comprising 0.01 to 5 parts by mass of a surfactant (C) relative to 100 parts by mass of a combination of 5 to 70% by mass of a side-chain crystalline resin (A) and 95 to 30% by mass of water (B), wherein the side-chain crystalline resin of component (A) is (i) a side-chain crystalline olefin-based polymer obtained by polymerization of one or more of higher α-olefins having 10 or more carbon atoms or (ii) a side-chain crystalline olefin-based polymer obtained by polymerization of one or more of higher α-olefins having 10 or more carbon atoms and one or more of α-olefins having 9 or less carbon atoms and the content of said higher α-olefin unit content is 50 mol % or more and has a melting point of 10-100° C.

2. The water dispersible resin composition according to claim 1, wherein a content of the surfactant of component (C) is 0.01 to 1 part by mass.

3. The water dispersible resin composition according to claim 1, further comprising 0.01 to 1 part by mass of a water soluble polymer compound (D) relative to 100 parts by mass of a sum of component (A) and component (B).

4. The water dispersible resin composition according to claim 1, further comprising 2 to 200 parts by mass of a water insoluble organic solvent (E) relative to 100 parts by mass of a sum of component (A) and component (B).

5. The water dispersible resin composition according to claim 1, wherein a mixed solution of component (A), component (B) and component (C) is mixed at a temperature range from 50 to 90° C.

6. The water dispersible resin composition according to claim 3, wherein a mixed solution of component (A), component (B), component (C) and component (D) is mixed at a temperature range of 50 to 90° C.

7. The water dispersible resin composition according to claim 4, wherein a mixed solution I of component (A) and component (E) with a mixed solution of component (B) and component (C) are mixed at a temperature range of 50 to 90° C.

8. A water dispersible polyolefin-based resin composition comprising a combination of 5 to 80% by mass of a modified side-chain crystalline polyolefin-based resin (G) and 95 to 20% by mass of water (B), wherein the modified side-chain crystalline polyolefin-based resin (G) is produced by modifying (i) a side-chain crystalline olefin-based polymer obtained by polymerization of one or more of higher α-olefins having 10 or more carbon atoms or (ii) a side-chain crystalline olefin-based polymer obtained by polymerization of one or more of higher α-olefins having 10 or more carbon atoms and one or more of α-olefins having 9 or less carbon atoms with a content of said higher α-olefin unit being 50 mol % or more and having a melting point of 10-100° C., with a radical initiator and an organic acid, organic acid anhydride or organic acid ester.

9. The water dispersible polyolefin-based resin composition according to claim 8, further comprising one or more selected from 0.01 to 1 part by mass of a water soluble basic substance (F), 0.01 to 1 part by mass of a surfactant (C) and 0.01 to 1 part by mass of a water soluble polymer compound (D), relative to 100 parts by mass of a sum of component (G) and component (B).

10. The water dispersible polyolefin-based resin composition according to claim 8, further comprising 2 to 200 parts by mass of a water insoluble organic solvent (E) relative to 100 parts by mass of a sum of component (G) and component (B).

11. The water dispersible polyolefin-based resin composition according to claim 8, wherein component (G) and component (B) are mixed at a temperature range of 50 to 90° C.

12. The water dispersible polyolefin-based resin composition according to claim 9, wherein a mixed solution of component (B) with one or more selected from component (G), and component (F), component (C) and component (D) is mixed at a temperature range of 50 to 90° C.

13. The water dispersible polyolefin-based resin composition according to claim 10, wherein a mixed solution of component (B) with a mixed solution II of component (G) and component (E) are mixed at a temperature range of 50 to 90° C.

14. The water dispersible resin composition according to claim 3, further comprising 2 to 200 parts by mass of a water insoluble organic solvent (E) relative to 100 parts by mass of a sum of component (A) and component (B).

15. The water dispersible resin composition according to claim 14, wherein a mixed solution I of component (A) and component (E) with a mixed solution of component (B), component (C) and component (D) are mixed at a temperature range of 50 to 90° C.

16. The water dispersible polyolefin-based resin composition according to claim 9, further comprising 2 to 200 parts by mass of a water insoluble organic solvent (E) relative to 100 parts by mass of a sum of component (G) and component (B).

17. The water dispersible polyolefin-based resin composition according to claim 16, wherein a mixed solution II of component (G) and component (E) with a mixed solution of component (B) and one or more selected from component (F), component (C) and component (D) are mixed at a temperature range of 50 to 90° C.

* * * * *